US 6,581,406 B2

(12) United States Patent
Pai et al.

(10) Patent No.: US 6,581,406 B2
(45) Date of Patent: Jun. 24, 2003

(54) ABSORPTION DIFFUSION TYPE REFRIGERATING STRUCTURE

(75) Inventors: Hao Pai, Hsintien (TW); Ru He Jan, Hsintien (TW); Chin Hung Kuo, Hsintien (TW)

(73) Assignee: Heat Energy Advanced Technology Corp., Taipei Hsien (TW)

( * ) Notice: Subject to any disclaimer, the term of this patent is extended or adjusted under 35 U.S.C. 154(b) by 0 days.

(21) Appl. No.: 10/143,936

(22) Filed: May 14, 2002

(65) Prior Publication Data

US 2003/0000243 A1 Jan. 2, 2003

(30) Foreign Application Priority Data

May 18, 2001 (TW) ........................................ 90112039 A

(51) Int. Cl.[7] ................................................ F25B 15/12
(52) U.S. Cl. .............................. 62/484; 62/476; 62/492
(58) Field of Search .......................... 62/484, 485, 487, 62/490, 491, 492, 493, 498, 476, 101

(56) References Cited

U.S. PATENT DOCUMENTS

| | | | | |
|---|---|---|---|---|
| 4,020,646 A | * | 5/1977 | Oda et al. ...................... | 62/492 |
| 4,137,727 A | * | 2/1979 | Kuhlenschmidt ............ | 62/490 |
| 4,176,529 A | * | 12/1979 | Stierlin et al. ................ | 62/490 |
| 4,178,774 A | * | 12/1979 | Almen ......................... | 62/493 |
| 4,458,504 A | * | 7/1984 | Wallgren et al. .............. | 62/490 |
| 5,499,516 A | * | 3/1996 | Anderson et al. ............. | 62/494 |
| 5,865,039 A | * | 2/1999 | Muller et al. ................. | 62/490 |

* cited by examiner

*Primary Examiner*—Melvin Jones
(74) *Attorney, Agent, or Firm*—Rosenberg, Klein & Lee

(57) ABSTRACT

An absorption diffusion type refrigerating structure comprises a generator, a rectifier, a condenser, an evaporator, a concentrated ammonia aqueous solution tank, and an absorber. The absorber is vertical. A spiral device is disposed in the absorber to lengthen the flow path of diluted ammonia aqueous solution, to extend the time of diluted ammonia aqueous solution in the absorber, and to expand the reaction area of diluted ammonia solution in the absorber, thereby reducing the whole weight, shrinking the volume, and enhancing the refrigerating speed. An ammonia liquid pipe and a hydrogen pipe are arranged in the evaporator. The evaporator has a simple and symmetrical shape, and can be processed and assembled easily, hence saving the space thereof. Moreover, because the ammonia liquid pipe and the hydrogen pipe are arranged in the evaporator, the effect of heat exchange thereof is better, and the refrigerating temperature is lower.

20 Claims, 9 Drawing Sheets

ABSORPTION DIFFUSION TYPE REFRIGERATING STRUCTURE

FIELD OF THE INVENTION

The present invention relates to an absorption diffusion type refrigerating structure and, more particularly, to a refrigerating structure of largely shrunk volume and reduced weight.

BACKGROUND OF THE INVENTION

A conventional refrigerating circulation system of an air conditioner comprises mainly a titanium heat pipe generator 1, a hydrogen chest 2, a separator 3, a liquid heat exchanger 4, an absorber 5, a dehydrator 6, a condenser 7, an evaporator 8, an air heat exchanger 9, a filter pipe 10, an analyzer 11, a U-shaped pipe 12, a fan 13, and a mineral wool plate 14. Ammonia aqueous solution has a high latent heat to be used as a refrigerant. Because water can absorb a large amount of ammonia at room temperature and pressure, and the absorbed ammonia will divagate from water when water is heated, water is used as an absorbent in reverse process. Moreover, hydrogen will accelerate the evaporation rate of ammonia to provide pressure equilibrium for the system. For a system achieving absorption refrigerating circulation through gravity and heat, the whole system is non-mechanical. There will be no action of revolution of compressor, not to mention sound of revolution of compressor.

As shown in FIG. 1, heat is added to the generator 1 to let ammonia divagate from the solution after the titanium heat pipe is electrified. The ammonia vapor at high temperature will rise along the filter pipe 10 and carry part solution to enter the separator 3, where the vapor and the liquid will separately flow along pipeline 3a and 3b, respectively. The liquid flows into the liquid heat exchanger 4 from the pipeline 3b by gravity, and then reaches the absorber 5. The vapor in the separator 3 descends and diverts to the analyzer 11 from the central pipeline 3a. Because the vapor is lighter, after it rises to the dehydrator 6, if there is still any water or condensed liquid, they will flow downwards to the analyzer 11 and then back into the generator 1. The dehydrator 6 has a plurality of annular baffle plates 6a to block the vapor from carrying liquid upwards.

After passing the dehydrator 6, pure ammonia is obtained to enter the condenser 7, which is divided into a condensing pipe 7a and a condensing pipe 7b. The condensing pipe 7a has fins capable of condensing part of the vapor. Heat in the system is only utilized in upward circulation and only up to the condensing pipe 7a. Subsequent circulation relies only on gravity to let pure ammonia flow to the evaporator 8. Additionally, the vapor not condensing at the condensing pipe 7a rises to the condensing pipe 7b and then condenses there. The U-shaped pipe 12 between the condenser 7 and the evaporator 8 is used for storing ammonia liquid. When the storage of ammonia liquid exceeds a predetermined level, the ammonia liquid will flow into the evaporator 8. Because the liquid is affected by gravity, horizontal equilibrium is accomplished.

After the liquid brims the U-shaped pipe 12, it will flow into the evaporator 8. When the ammonia liquid enters the evaporator 8 and forms a thin film of ammonia liquid on a series of horizontal baffle plates 8a, hydrogen gas will fill into the U-shaped pipe 12 to decrease the pressure of the ammonia liquid to a designed standard so that the ammonia liquid can evaporate at low temperatures. When the ammonia liquid evaporates, it will absorb heat, hence accomplishing the effect of condensation. The vapor will be discharged by the fan 13 and be isolated by the mineral wool plate 14.

The more the hydrogen, the less the ammonia, and the lower the temperature thereof. When the ammonia liquid is evaporated and mixed with the hydrogen gas, the mixed gas will be heavier than the hydrogen gas, and will descends into the absorber 5 along an inner pipe 9a of the vapor heat exchanger 9. Simultaneously, the hydrogen gas rising from an outer pipe 9b is refrigerated. Diluted ammonia aqueous solution flowing from the separator 3 via the liquid heat exchanger 4 into the top of the absorber 5 will absorb ammonia vapor once contacting the mixed gas coming from the vapor heat exchanger 9. Therefore, only the hydrogen gas remains. Because the hydrogen gas is insoluble in water and is lighter, it will rise into the evaporator 8 along the outer pipe 9b of the vapor heat exchanger 9 to mix with the ammonia vapor again. The absorber 5 has fins 5a outside cooled by air. This will refrigerate diluted ammonia aqueous solution and enhance its capability of absorption.

Simultaneously, when diluted ammonia aqueous solution absorbs ammonia vapor, it will also generate heat. Therefore, using the air-cooled fins 5a to remove heat will enhance continual circulation of the system. When the solution absorbs a large amount of ammonia vapor, it becomes concentrated ammonia aqueous solution and descends to the bottom of the absorber 6, and continually descends back into the generator 1 via the liquid heat exchanger 4 and the analyzer 11 to start another circulation.

The prior art has the following drawbacks. The pipeline of the evaporator is very long and complicated, and the vapor and liquid separator also occupy much space. Moreover, the condenser has a curved loop, which requires more space. Mutual flow between ammonia liquid, ammonia vapor, and hydrogen gas in the evaporator affects the whole stability, and requires a very long pipeline, which is very uneconomic. Furthermore, the vapor heat exchanger, the liquid heat exchanger, and the absorber also have very long pipelines, respectively, hence increasing the flow path of pipeline and the whole volume. Therefore, the prior art has a very large volume, which cannot be reduced. The present invention aims to resolve the above problems in the prior art.

SUMMARY OF THE INVENTION

One object of the present invention is to provide an absorption diffusion type refrigerating structure, wherein a capillary device is arranged in a concentrated ammonia aqueous solution tank to increase the surface of absorption reaction for enhancing extra absorption reaction. The absorber is vertical. The absorber has a spiral device therein to lengthen the flow path of diluted ammonia aqueous solution, to extend the time of diluted ammonia aqueous solution in the absorber, and to expand the reaction surface area of diluted ammonia aqueous solution in the absorber, hence reducing the whole weight, shrinking the volume, simultaneously increasing the refrigerating speed, and simplifying the shape and structure of the evaporator. An ammonia liquid pipe and a hydrogen pipe are arranged in the evaporator.

The evaporator has a simple and symmetrical shape, and can be processed and assembled easily, hence saving the space thereof. Moreover, because the ammonia liquid pipe and the hydrogen pipe penetrate into the evaporator, the heat exchange thereof is better, the refrigerating temperature is lower, hence further reducing the system weight and shrinking the volume. Therefore, the present invention can produce smaller refrigerating structures with better operational characteristics, letting portable refrigerating structures be feasible.

The structure of the present invention has a concentrated ammonia aqueous solution tank to receive concentrated ammonia aqueous solution. The concentrated ammonia aqueous solution tank is led out via a concentrated ammonia aqueous solution pipe to penetrate into a diluted ammonia aqueous solution pipe to perform heat exchange. The diluted ammonia aqueous solution pipe passes through a generator, which joins a heater outside. After being heated, ammonia in the concentrated ammonia aqueous solution pipe evaporates to be separated out, and mixed vapor and liquid bubble flow of diluted ammonia aqueous solution and ammonia vapor passes through a separator and then rises to a pipeline of a rectifier. The diluted ammonia aqueous solution reflows from the separator, through the diluted ammonia aqueous solution pipe to be near the concentrated ammonia aqueous solution tank, and is then guided to an absorber via a diluted ammonia aqueous solution reflow pipe. Water steam condenses into water in the rectifier and reflows to the separator.

The ammonia vapor enters a condenser pipeline and condenses into ammonia liquid, which is then guided by an ammonia liquid pipe to penetrate into an evaporator pipeline. The absorber pipeline is connected with the concentrated ammonia aqueous solution tank to let concentrated ammonia vapor and hydrogen gas pass through the absorber. At this time, the concentrated ammonia vapor reacts with the reflowing diluted ammonia aqueous solution to become concentrated ammonia aqueous solution, which then reflows to the concentrated ammonia aqueous solution tank. Diluted ammonia vapor and hydrogen gas pass through an airway to the hydrogen pipe. The distal end of the airway is connected to the concentrated ammonia aqueous solution tank via a condensing ammonia liquid guide pipe. The hydrogen pipe penetrates into one end of the evaporator pipeline. Ammonia liquid and hydrogen gas are simultaneously released out from the other closed end of the evaporator pipeline to let the ammonia liquid evaporate and absorb heat, hence performing the reaction of heat exchange to absorb heat and refrigerate. The mixed gas of generated ammonia vapor and hydrogen gas will together flow back into the concentrated ammonia aqueous solution tank via a guide-in pipe.

The various objects and advantages of the present invention will be more readily understood from the following detailed description when read in conjunction with the appended drawing, in which:

DETAILED DESCRIPTION OF THE PREFERRED EMBODIMENTS

Figure 1:
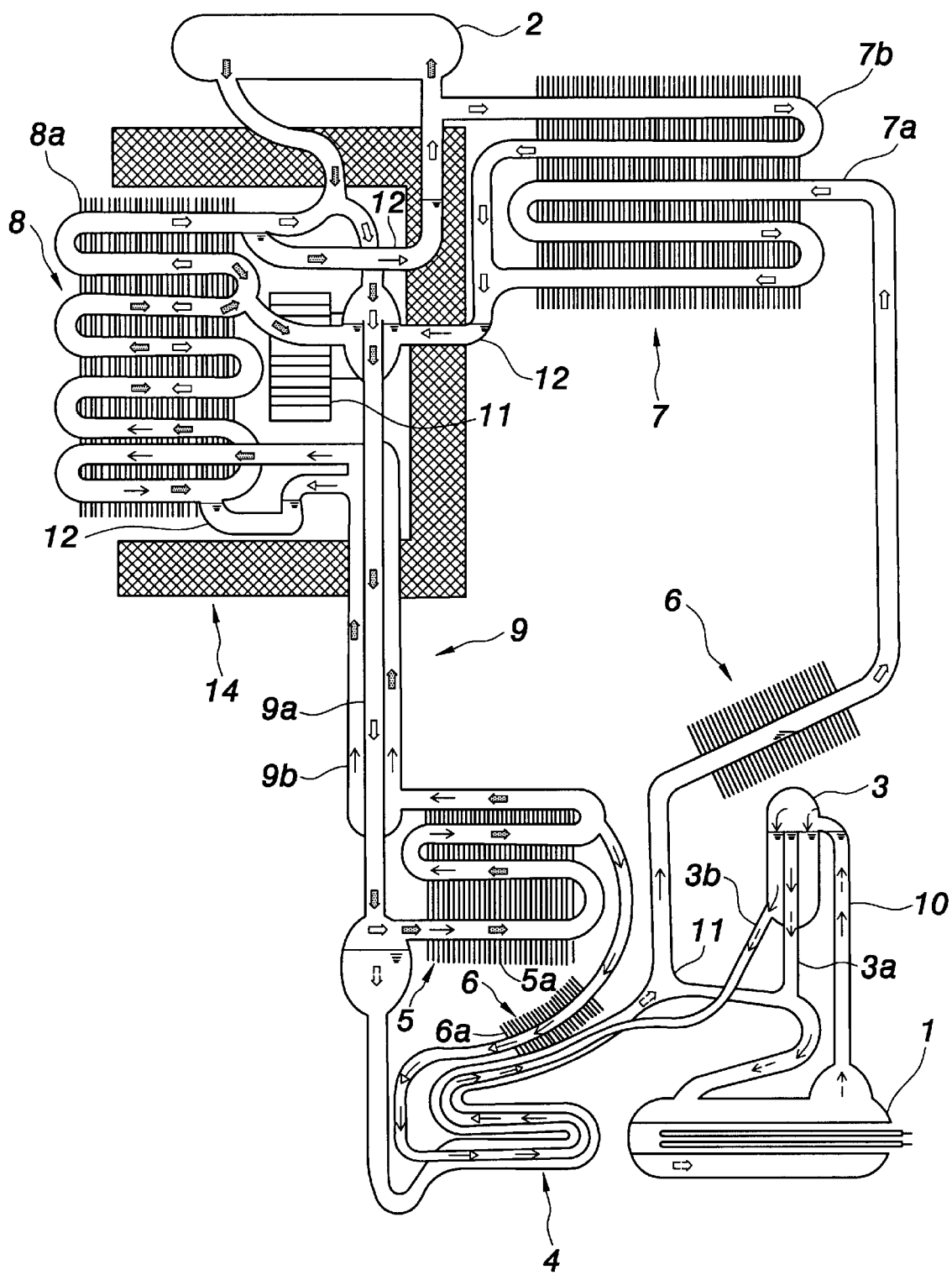
FIG. 1 is a diagram showing the arrangement of the prior art pipeline.

As shown in FIGS. 2 to 7, the present invention provides an absorption diffusion type refrigerating structure having a concentrated ammonia aqueous solution tank 31 to receive concentrated ammonia aqueous solution 71. The concentrated ammonia aqueous solution tank 31 is led out by a concentrated ammonia aqueous solution pipe 32. A pipe mouth 321 of the concentrated ammonia aqueous solution pipe 32 is situated in the concentrated ammonia aqueous solution tank 31, and protrudes out to prevent residue from entering the concentrated ammonia aqueous solution pipe 32. Residue will accumulate on the bottom face of the concentrated ammonia aqueous solution tank 31, and will not choke the pipe mouth 321 of the concentrated ammonia aqueous solution pipe 32. The concentrated ammonia aqueous solution pipe 32 can also be connected out from the end face of a horizontal pipe type concentrated ammonia aqueous solution tank 31.

The concentrated ammonia aqueous solution pipe 32 penetrates into a diluted ammonia aqueous solution pipe 37, which passes through a generator 30. The inserted end of the diluted ammonia aqueous solution pipe 37 is closed. The generator 30 joins a heater 33 outside to heat the diluted ammonia aqueous solution pipe 37 and the concentrated ammonia aqueous solution pipe 32. Part surface of the generator 30 is sheathed by a constricting tube 34 and an adiabatic body 35. The adiabatic body is situated outside the diluted ammonia aqueous solution pipe 37. The constricting tube 34 is situated outside the adiabatic body 35.

Figure 7:
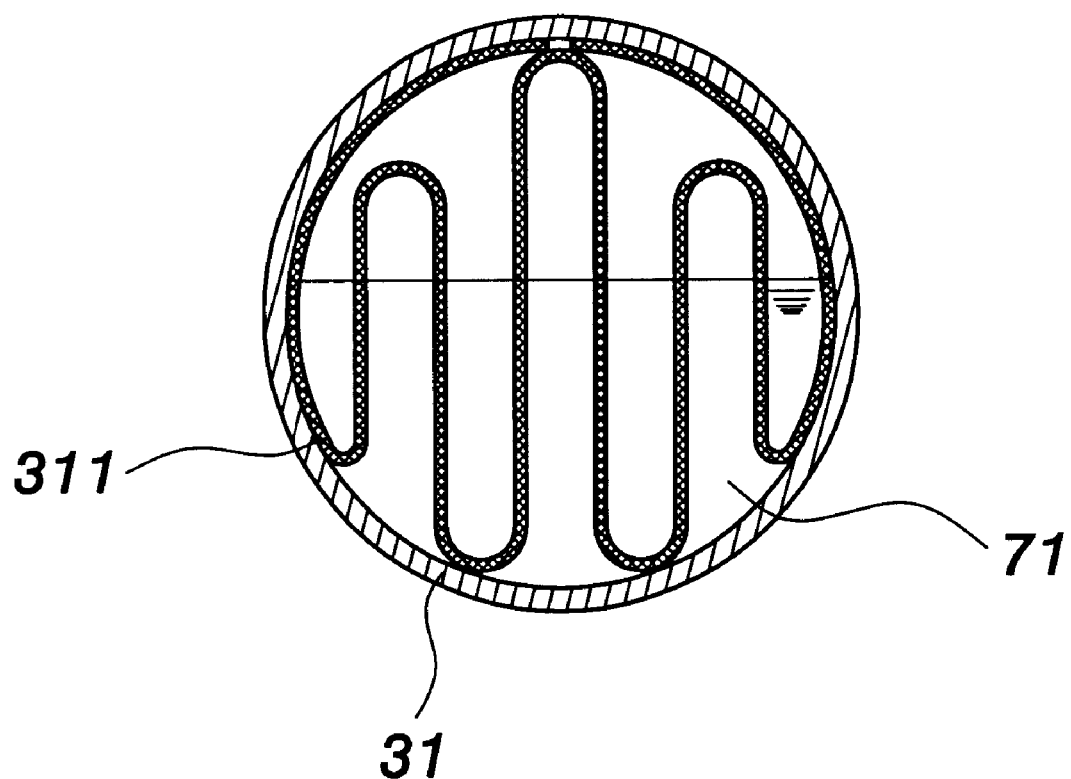
FIG. 7 is a lateral cross-sectional view of a concentrated ammonia aqueous solution tank of the present invention.

As shown in FIG. 7, a capillary device 311 can be added in the concentrated ammonia aqueous solution tank 31. Part of the capillary device 311 is situated below the liquid face to absorb the liquid, preventing the liquid face in the concentrated ammonia aqueous solution tank 31 from generating jolts. The capillary device 311 is porous. Part of the capillary device 311 is situated above the liquid face to absorb liquid, letting part ammonia of passing vapor be absorbed. That is, the surface of absorption reaction can be increased.

The heater 3 heats ammonia aqueous solution in the concentrated ammonia aqueous solution pipe 32 to separate out ammonia vapor 72 and generate vapor and liquid mixed bubble flow of diluted ammonia aqueous solution 74 and the ammonia vapor 72. The mixed bubble flow in the concentrated ammonia aqueous solution pipe 32 further includes the ammonia vapor 72 and water steam 73. They together rise to a pipeline of a rectifier 51 through a separator 36. The diluted ammonia aqueous solution 74 flows out from a separator 36, i.e., the distal end of the concentrated ammonia aqueous solution pipe 32, reflows vertically downwards from the diluted ammonia aqueous solution pipe 37 through the action of gravity, passed through the generator 30, and then reflows to near the concentrated ammonia aqueous solution tank 31 along the diluted ammonia aqueous solution pipe 37.

An enlarged pipe or the periphery of the diluted ammonia aqueous solution pipe 37 joins a diluted ammonia aqueous solution reflow pipe 38, which is connected to an absorber 40. The distal end of the diluted ammonia aqueous solution reflow pipe 38 is lower than the separator 36 so that the diluted ammonia aqueous solution 74 can naturally flow back into the absorber 40 through the action of gravity. The outer surface of the distal end of the diluted ammonia aqueous solution reflow pipe 38 can have a plurality of dissipating fins 39 to cool the diluted ammonia aqueous solution 74 in advance.

The pipeline at the rectifier 51 forms a curved pipe shape. Because the ammonia vapor 72 in this section also contains water steam 73, which is detrimental to the reaction of evaporation, the pipeline of the rectifier 51 is used to refrigerate the water steam 73 and the ammonia 72 to let the water steam 73 condense into water liquid 70 and part of the ammonia vapor 72 condense into ammonia liquid 76, which then reflow to the diluted ammonia aqueous solution pipe 37 along the rectifier 51.

High purity ammonia vapor 75 enters a condenser 50, which comprises a first pipeline 52 of condenser and a second pipeline 55 of condenser. A plurality of first fins 53 and second fins 56 are disposed outside the first pipeline 52 of condenser and the second pipeline 55 of condenser, respectively. An adapting block 54 of condenser is connected between the two pipelines 52 and 55 to save the occupied space. The first fins 53 and the second fins 56 are respectively disposed on the first pipeline 52 and the second pipeline 55 to more quickly condense the pure ammonia vapor 75 into the ammonia liquid 76.

Because the pipelines 52 and 55 are slantingly disposed and are of reflected shape, the ammonia liquid 76 will flow to the distal end of the second pipeline 55. The distal end of the second pipeline 55 joins a first ammonia liquid pipe 57. The front section of the first ammonia liquid pipe 57 has a plurality of third fins 58 to enhance refrigerating effect. The first ammonia liquid pipe 57 then penetrates into a pipeline 62 of an evaporator 60 via a second ammonia liquid pipe 59.

Figure 2:
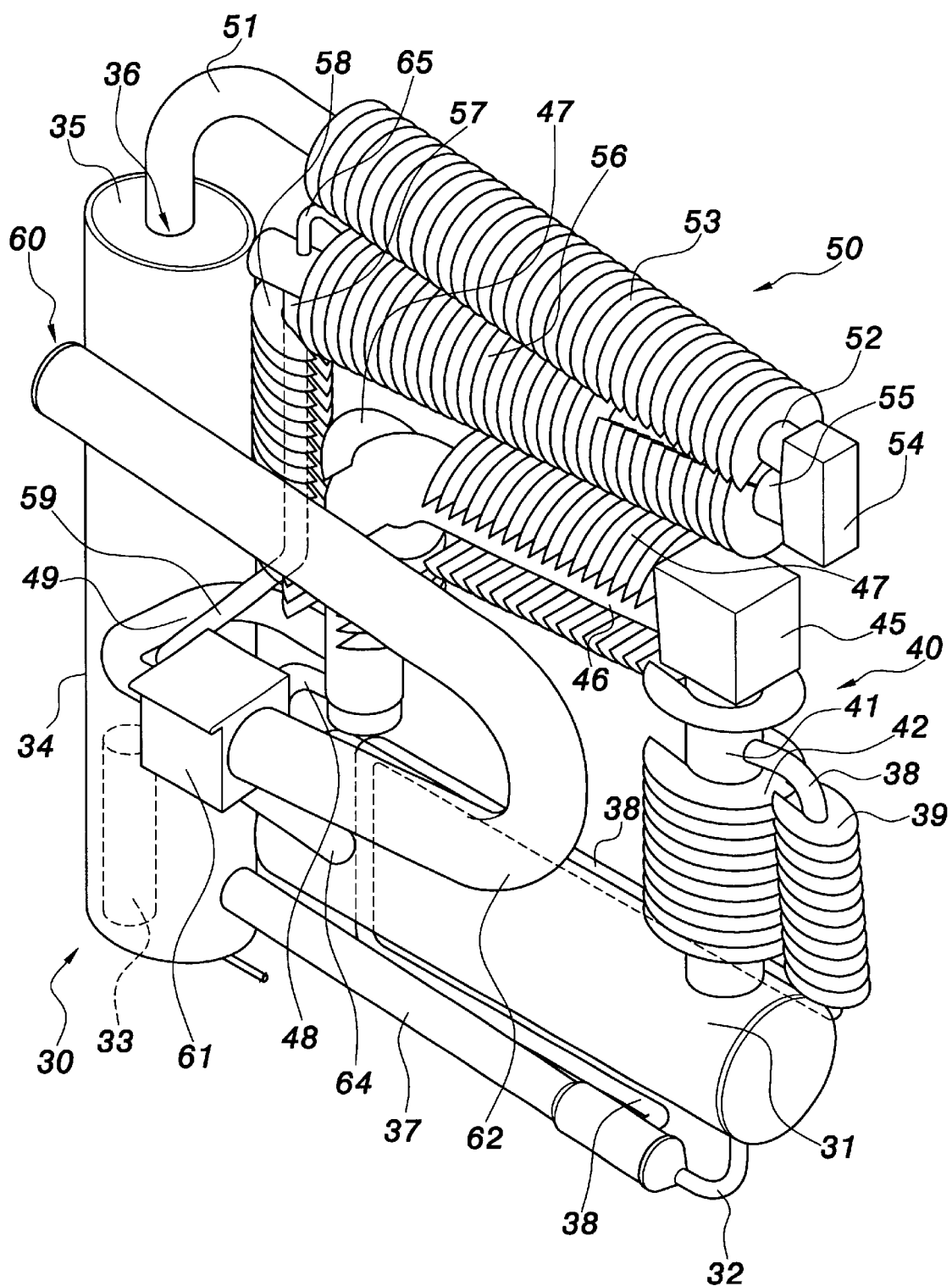
FIG. 2 is a perspective view of the present invention.
Figure 3:
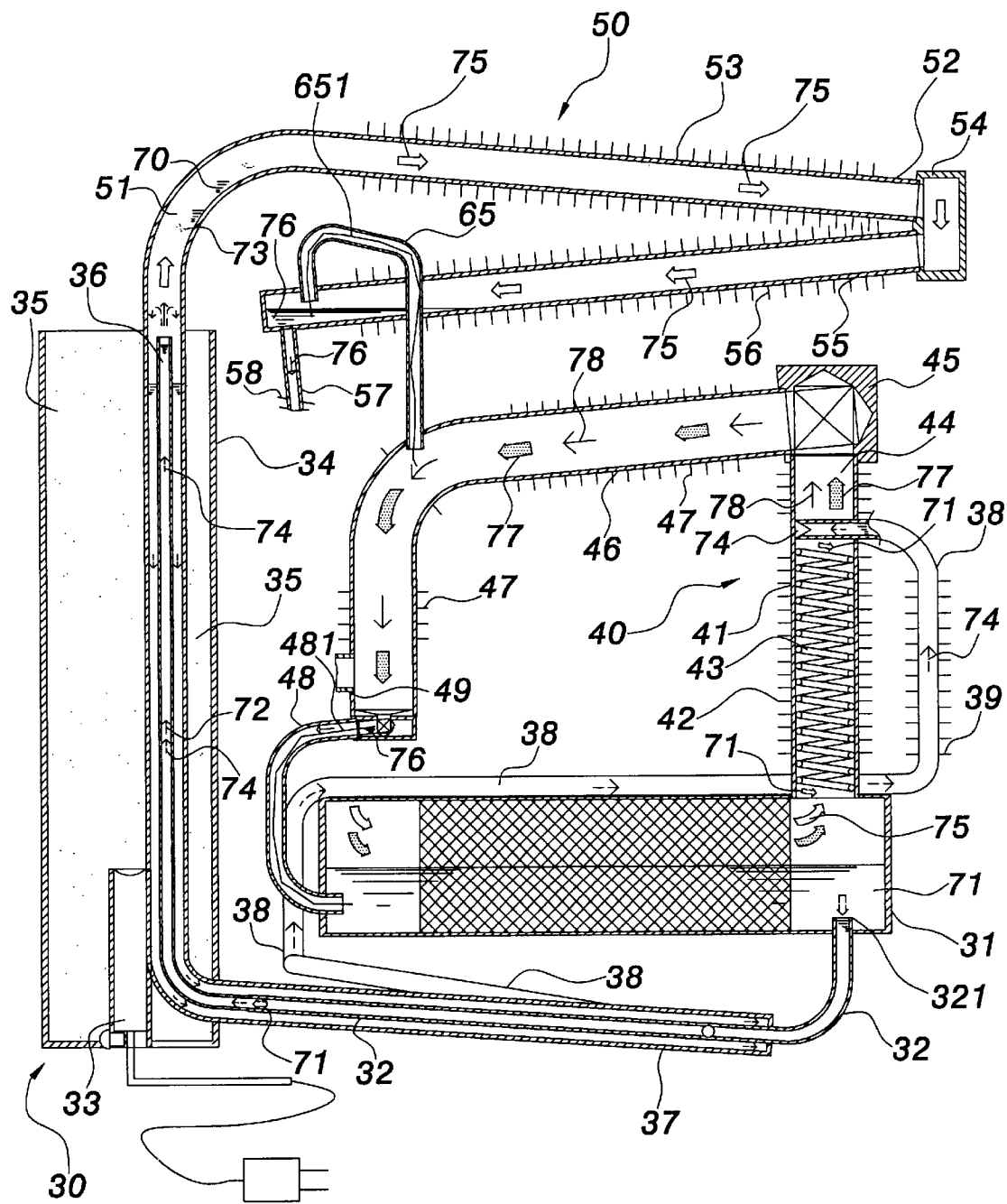
FIG. 3 is a cross-sectional view of the present invention.

A liquid-shutting loop is formed between two ends of the ammonia liquid pipe comprising the first ammonia liquid pipe 57 and the second ammonia liquid pipe 59. The liquid-shutting loop can be U-shaped or spiral. In FIG. 2, the whole ammonia liquid pipe is U-shaped to directly form a liquid-shutting loop.

Figure 4:
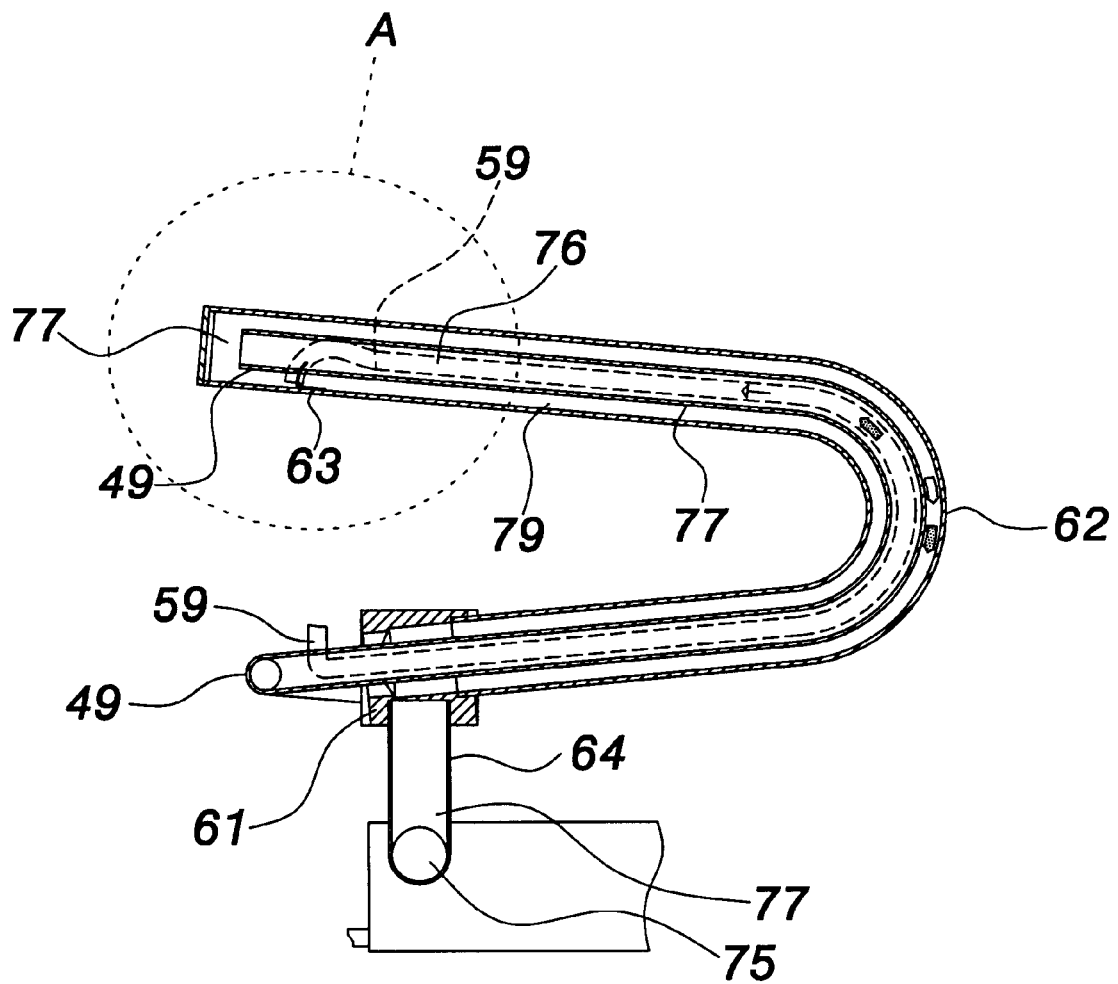
FIG. 4 is a longitudinal cross-sectional view of an evaporator of the present invention.

As shown in FIG. 4, the other end of the second ammonia liquid pipe 59 is open. The open end is of downwards curved shape to form a outflow mouth for guidance, hence guiding out ammonia liquid and preventing ammonia liquid from creeping on the outer pipe wall of the second ammonia liquid pipe 59. Therefore, the outflow ammonia liquid will expand so that the refrigerating capability will not be affected because the ammonia liquid pipe is arranged in the evaporator 60.

After the first ammonia liquid pipe 57 passes through a bearing block 61, the second ammonia liquid pipe 59 is contained in the pipeline 62. In fact, the first ammonia liquid pipeline 57 and the second ammonia liquid pipeline 58 are the same pipeline. Similarly, the diluted ammonia aqueous solution pipe 37, the pipeline of the rectifier 51, the first pipeline 52 of condenser, and the second pipeline 55 of condenser are the same pipeline. These designs can facilitate manufacturing.

One end of the absorber pipeline 41 of the absorber 40 joins the concentrated ammonia aqueous solution tank 31. The absorber 40 has the reflowing diluted ammonia aqueous solution 74 therein. The absorber pipeline 41 has a plurality of absorber fins 42 outside. The inner wall of the absorber pipeline 41 has a wick spiral device 43 so that the diluted ammonia aqueous solution 74 can go around downwards along the inner peripheral wall of the absorber pipeline 41. Mixed gas formed of hydrogen gas 77 and ammonia vapor 79 flowing in from the evaporator 60 exists above the liquid face in the concentrated ammonia aqueous solution tank 31.

When the mixed gas passes by the liquid face of concentrated ammonia aqueous solution 71, it performs a first absorption reaction to absorb the ammonia vapor 75 from the mix gas to the concentrated ammonia aqueous solution tank 31. The mixed gas is then guided into the absorber 40 to perform a second absorption reaction. The ammonia vapor 75 enters the pipeline 41 of the absorber 40 and reacts with the diluted ammonia aqueous solution 74 to become gradually into the concentrated ammonia aqueous solution 71, which then reflows to the concentrated ammonia aqueous solution tank 31 along the wick spiral device 43.

In addition, a pressing region 44 is formed near the other end of the absorber pipeline 41. The pressing region 44 is situated above the absorber pipeline 41 and the diluted ammonia aqueous solution reflow pipe 38. The pressing region 44 utilizes gravity to press the ammonia vapor 75 flowing into the evaporator 60. The other end of the absorber pipeline 41 joins an absorber guide block 45, which is connected with an airway 46. The airway 46 has a plurality of refrigerating fins 47 outside to further cool not wholly absorbed ammonia vapor 75 into the ammonia liquid 76. In this embodiment, the absorber is of vertical pipe type, but it can also be replaced with a coiled pipe type absorber.

Because the airway 46 is bent downwards, after the ammonia vapor 75 of the mix gas are absorbed by the absorber 40, part of the ammonia vapor 75 and the reflowing diluted ammonia aqueous solution 74 will react in the absorber 40 to become the reflowing concentrated ammonia aqueous solution 71, hence further reducing the amount of ammonia vapor in the mixed gas. The diluted mixed gas of the diluted ammonia vapor 78 and the hydrogen gas 77 then flows through the airway 46. Because the distal end of the airway 46 is largely pure hydrogen 77, the airway 46 joins an upward hydrogen pipe 49 to guide the hydrogen 77 upwards.

Figure 5:
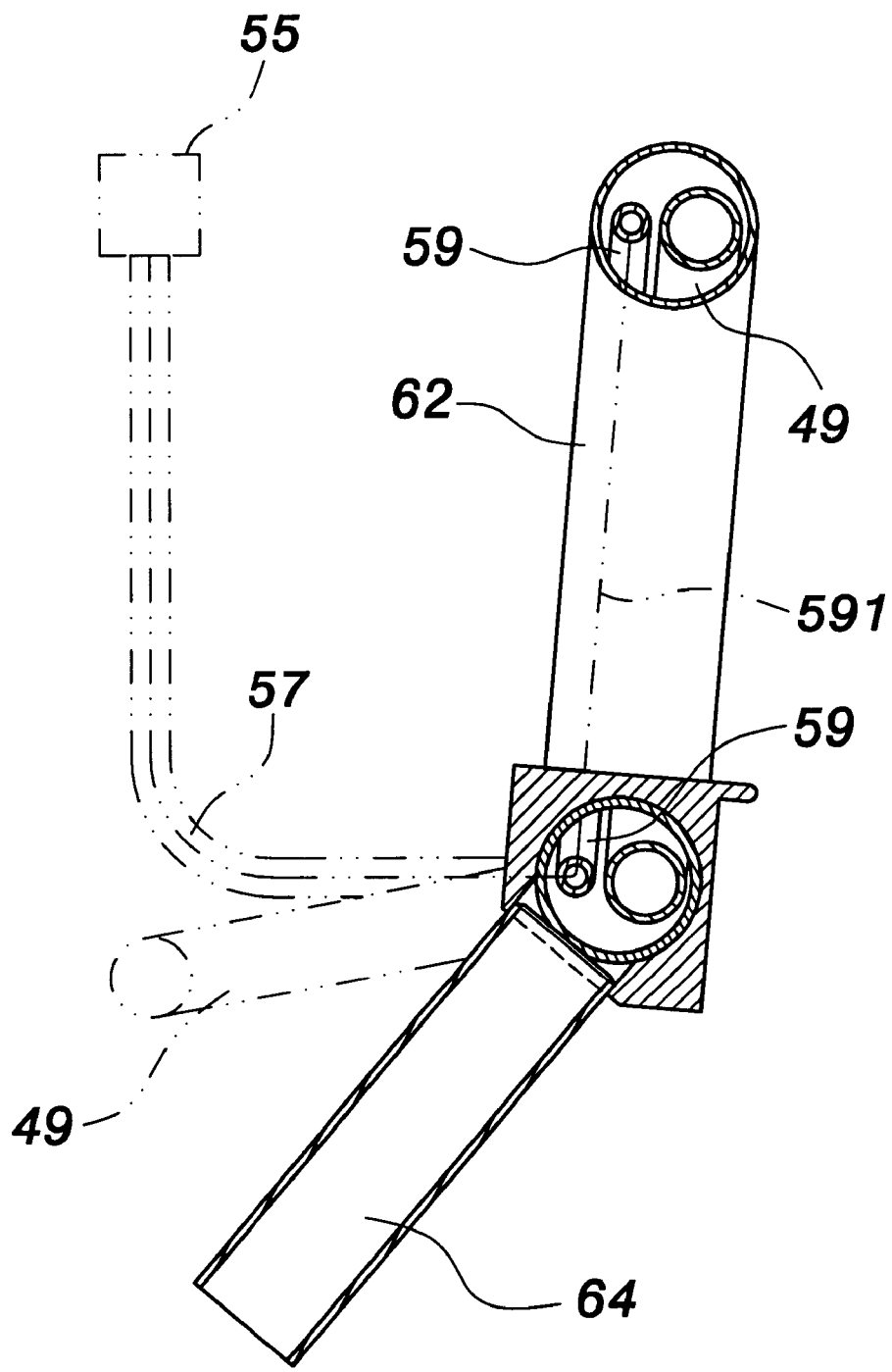
FIG. 5 is a lateral cross-sectional view of an evaporator of the present invention.
Figure 6:
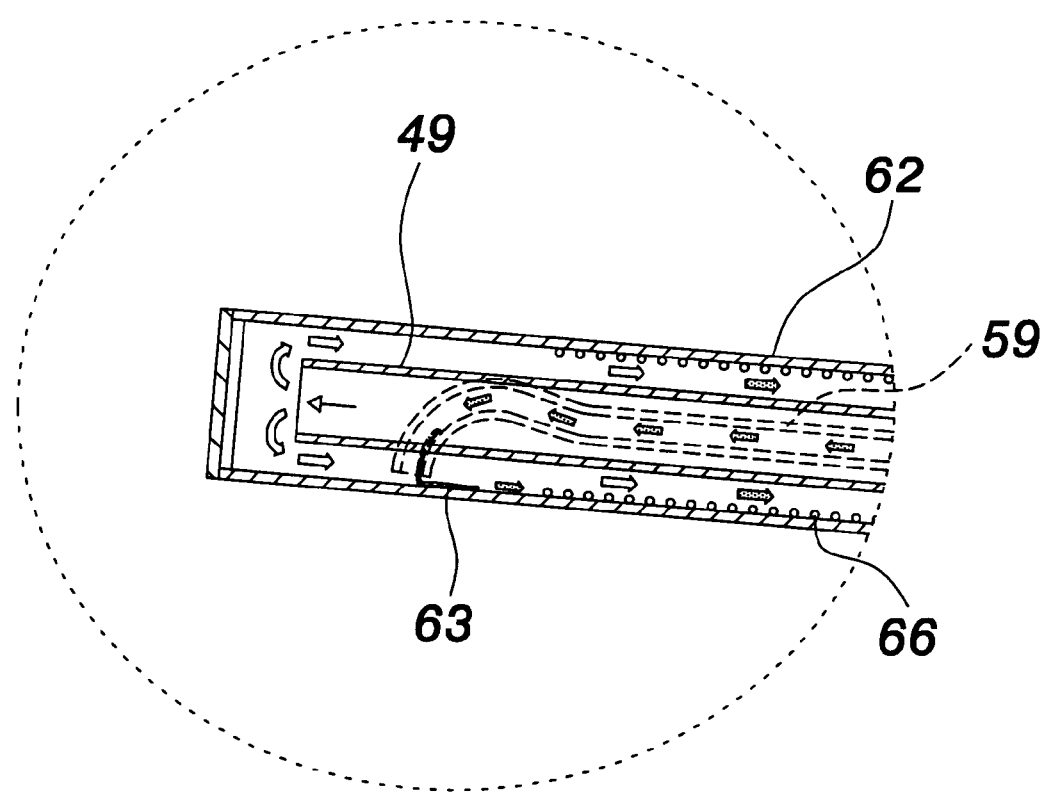
FIG. 6 is a partly enlarged view of the part A shown in FIG. 4.

The distal end of the airway 46 is connected to the concentrated ammonia aqueous solution tank 31 via an ammonia liquid guide pipe 48. The ammonia liquid guide pipe 48 can have a capillary device 481 to avoid liquid-shutting phenomenon due to a too-small caliber or condensation and to prevent condensing ammonia liquid from accumulating in the ammonia liquid guide pipe 48. The other end of the ammonia liquid guide pipe 48 is connected to a position below the liquid face of the concentrated ammonia aqueous solution tank 31. The hydrogen pipe 49 also passes through the bearing block 61 to penetrate into the pipeline 62 of the evaporator 60. As shown in FIGS. 4 and 5, the pipeline 62 of the evaporator 60 is simultaneously abreast of the hydrogen pipe 49 and the second ammonia liquid pipe 59. The hydrogen pipe 49 has a capillary device 491 of hydrogen pipe to prevent liquid-shutting phenomenon. The pipeline 62 of the evaporator 60 can be of bent sideward-U shape. The hydrogen pipe 49 and the second ammonia liquid pipe 59 form exits near inside the other end of the pipeline 62 to simultaneously release the ammonia liquid 76 and the hydrogen gas 77.

Therefore, the ammonia liquid 76 and the hydrogen gas 77 can perform evaporation reaction of heat exchange to absorb heat and refrigerate. After being evaporated, the generated mixed gas of the ammonia vapor 79 and the hydrogen gas 77 will reflow together from the other end to be near one end of the pipeline 62 along the internal space of the pipeline 62. The pipeline 62 is connected to a guide-in pipe 64 to let the concentrated ammonia 75 and the hydrogen gas 77 be discharged into the concentrated ammonia aqueous solution tank 31 via the guide-in pipe 64.

The other end of the evaporator 60 is not higher than the distal end of the second pipeline 55, and forms a U-shaped connected pipe to let the ammonia liquid 76 flow naturally through the action of gravity and flow out from the other end of the pipeline 62. The speed of heat exchange at this position is high to facilitate the outflow of the ammonia liquid. As shown in FIG. 4, the distal end of the second ammonia liquid pipe 59 has a capillary device 63 of evaporator to achieve very better effect of guidance. Simultaneously, the capillary device 63 of evaporator is utilized to expand the evaporation area of ammonia liquid to facilitate evaporation of ammonia liquid into ammonia vapor, hence enhancing the refrigerating efficiency and speed.

Through the help of forward guidance, the evaporator 60 of the present invention can achieve very fast heat exchange. A pressure equilibrium pipe 65 can further be disposed between the top face of the distal end of the second pipeline 55 of the condenser 50 and the top face of the bent section of the airway 46 to achieve equilibrium of pressure of the system. Furthermore, a capillary device 651 can be disposed in the pressure equilibrium pipe 65 to avoid liquid shutting phenomenon due to condensation.

Additionally, a spiral device 66 of evaporator is disposed on the inner pipe wall of the pipeline 62 of the evaporator 60. The spiral device 66 is a spiral groove or concentrically circular grooves formed on the inner pipe wall, a spiral spring or fiber bundles arranged therein, or a capillary device, all of which can facilitate the expansion of the liquid face of ammonia liquid and thus enhance the refrigerating performance. The capillary device is made of knitted net, sintered powder, fiber bundle, or foaming metal. The above spiral device 43 of absorber can be similar to or the same as the spiral device 66 of evaporator.

Therefore, all of the capillary device of the pressure equilibrium pipe, the capillary device of the hydrogen pipe, the capillary device of the evaporator, the capillary device of the spiral device of evaporator, the capillary device of the spiral device of absorber, and the capillary device of the concentrated ammonia aqueous solution tank are made of any one or any combination of knitted net, fiber bundle, sintered powder, and foaming metal.

Figure 8:
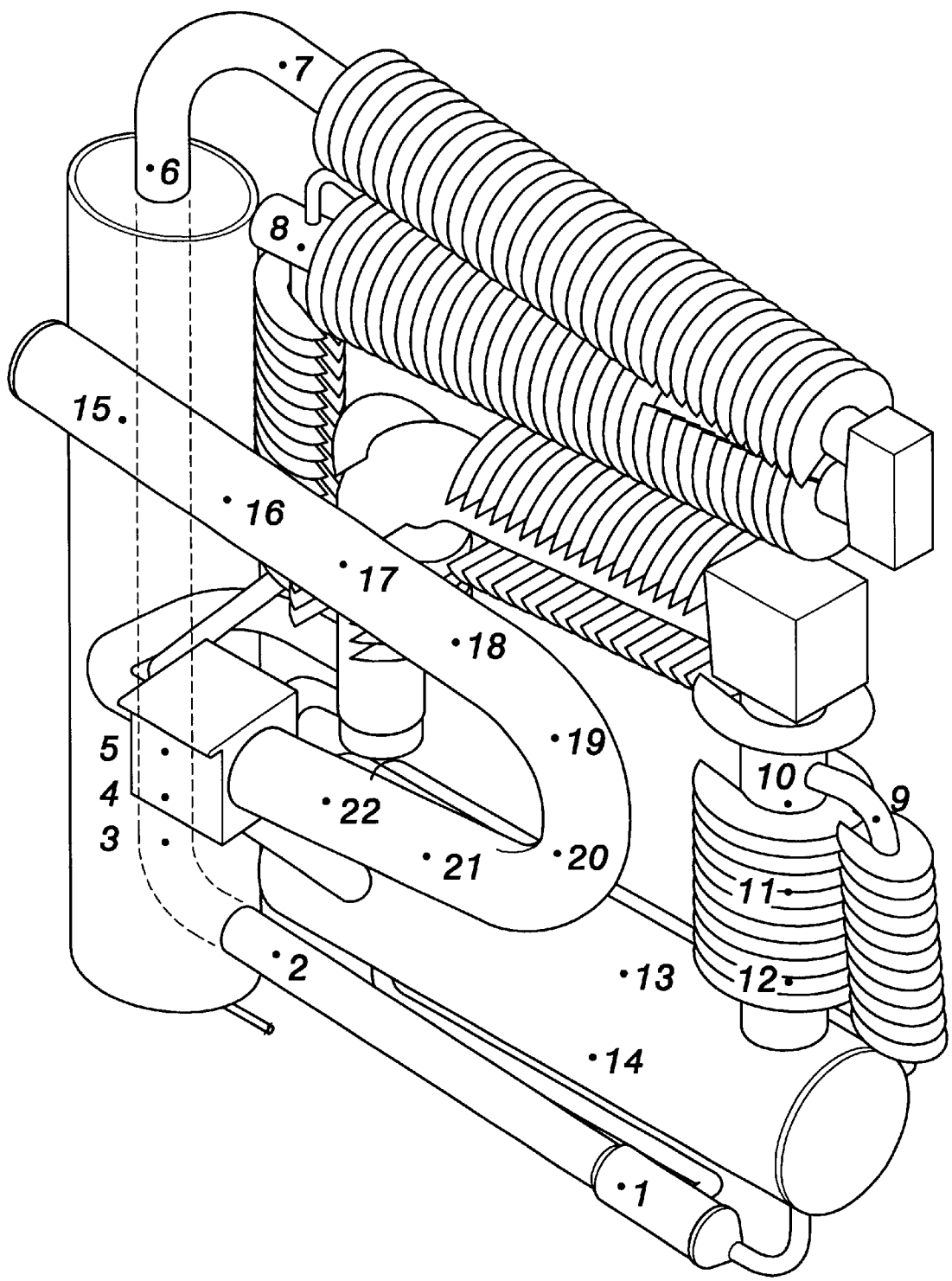
FIG. 8 is a position diagram of the test points of the present invention.
Figure 9:
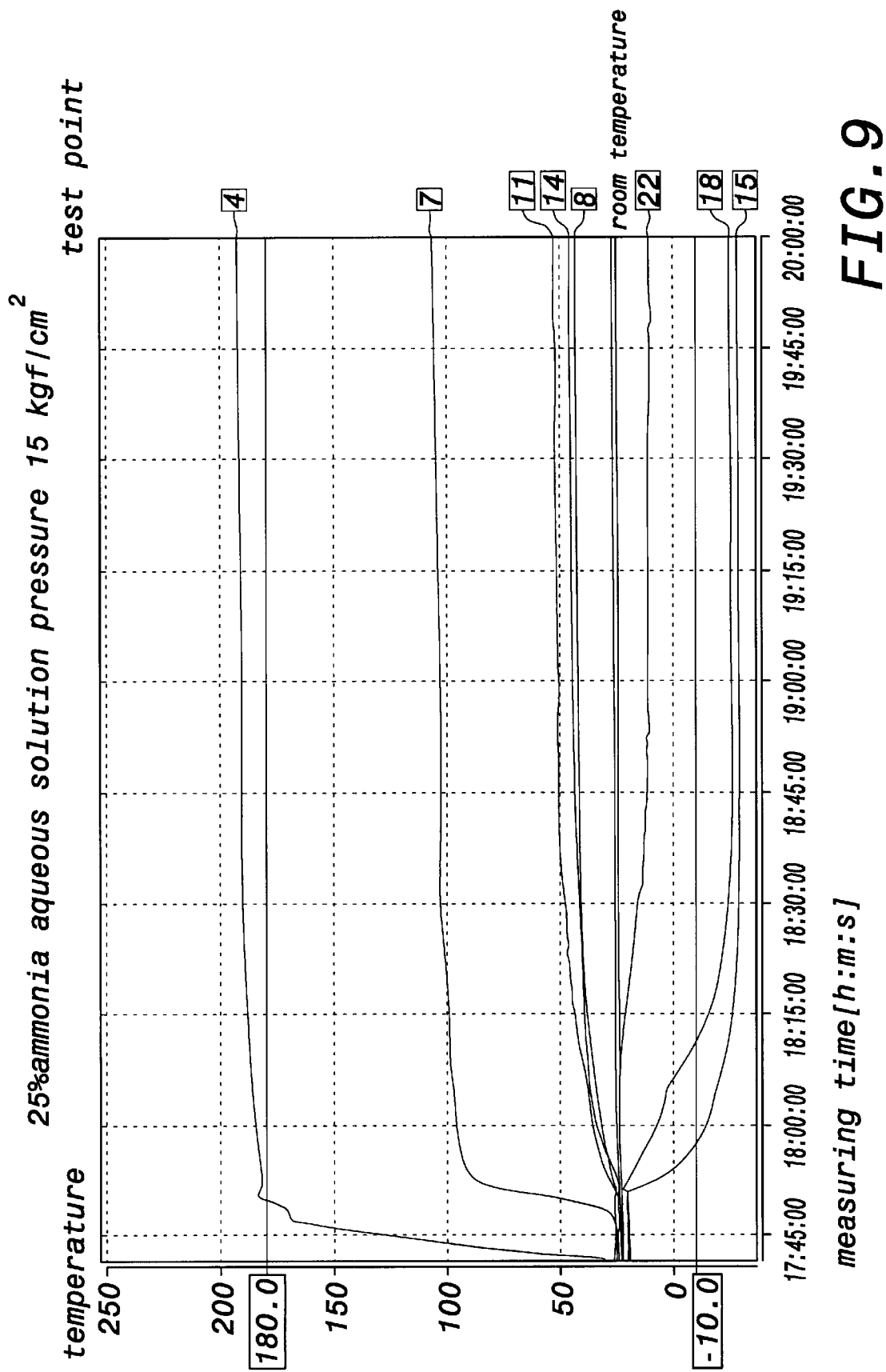
FIG. 9 shows measurement graphs of part of the test points of the present invention.

In the above embodiment, fins are utilized for heat radiation on the outer surface of the condenser and the absorber. The main function of the fins is to generate heat exchange. Therefore, heat exchangers can be disposed outside the condenser and the absorber, respectively. The heat exchanger comprises the above sheet heat-radiating fins and an integrally formed heat radiator or cooling water sleeve. For an embodiment of the present invention, FIG. 8 is a position diagram of test points, FIG. 9 shows measurement graphs of part of the test points of the present invention, and Table 1 shows test temperatures of the test points. The ammonia aqueous solution has a weight percentage of 25%. The pressure of filled-in hydrogen is 15 kgf/cm$^2$. The average room temperature is 24.9° C. A heater of 110VAC and 45W is used. Both the generator and the evaporator are sheathed by ceramic cotton.

TABLE 1

| Test point | Temperature ° C. | All the set positions are on the outer surface |
| --- | --- | --- |
| 1 | 65.4 | initial point of the concentrated ammonia aqueous solution pipe |
| 2 | 122.8 | middle point of the concentrated ammonia aqueous solution pipe |
| 3 | 191.8 | initial point of the generator |
| 4 | 188.4 | middle point of the generator |

TABLE 1-continued

| Test point | Temperature ° C. | All the set positions are on the outer surface |
| --- | --- | --- |
| 5 | 167.2 | final point of the generator |
| 6 | 157.9 | the vapor and liquid separator |
| 7 | 104.8 | initial point of the condenser |
| 8 | 41.8 | final point of the condenser |
| 9 | 41.6 | final point of the diluted ammonia aqueous solution reflow pipe |
| 10 | 47.3 | initial point of the absorber |
| 11 | 51.4 | middle point of the absorber |
| 12 | 55.2 | final point of the absorber |
| 13 | 44.8 | above the liquid face of the concentrated ammonia aqueous solution tank |
| 14 | 44.4 | below the liquid face of the concentrated ammonia aqueous solution tank |
| 15 | −29.9 | initial point of reaction in the evaporator |
| 16 | −29.1 | second point of reaction in the evaporator |
| 17 | −28.4 | third point of reaction in the evaporator |
| 18 | −26.5 | fourth point of reaction in the evaporator |
| 19 | −24.0 | fifth point of reaction in the evaporator |
| 20 | −19.2 | sixth point of reaction in the evaporator |
| 21 | −0.2 | seventh point of reaction in the evaporator |
| 22 | 10.0 | final point of reaction in evaporator |

From the above measurements matched with the graphs in FIG. 9, for a 3-hour measurement, operation of equilibrium is approached at about 15 minutes. Therefore, the present invention exactly can quickly achieve the effect of operation. Moreover, about half of the volume can be shrunk.

The present invention utilizes a twin-bushing structure at the generator to generate vapor and to further guide the separation of vapor and liquid. Usage of space is enhanced. Moreover, energy for heating the reflowing diluted ammonia aqueous solution is used again to heat the concentrated ammonia aqueous solution in the concentrated ammonia aqueous solution pipe, hence lessening the burden of the heater.

Additionally, the condenser disposed forwards down is different from the prior art coiled pipe type. A thicker pipeline is connected to the diluted ammonia aqueous solution pipe to facilitate manufacturing and flow of liquid and vapor in the pipeline.

The condensed ammonia liquid is guided into the pipeline of the evaporator in special way. A common pipe type evaporator is used to let the condensed ammonia liquid and hydrogen be guided into the evaporator together. Moreover, the open end of the ammonia liquid pipe has a capillary device and forms a curved shape to facilitate the action of guidance. In other words, the capillary device is used to guide the expansion of the ammonia liquid and to prevent the ammonia liquid from only creeping along the outer surface of the ammonia liquid pipe. The disposition of the capillary device can greatly improve the cold status of evaporation. Furthermore, a spiral device for resisting flow and expanding the surface area of evaporation of the ammonia liquid is disposed in the pipeline of the evaporator. Therefore, the present invention can use the most economic pipeline of the evaporator to form the best flow path.

Additionally, there is no independent hydrogen chest structure in the present invention. Appropriate quantity of hydrogen is filled into the system loop for circulatory flow. The concentrated ammonia aqueous solution tank also facilitates the flow of ammonia vapor and hydrogen gas, and is a storage space of ammonia aqueous solution. Moreover, a capillary device is disposed in the concentrated ammonia aqueous solution tank to absorb ammonia aqueous solution and to also provide larger absorption reaction area of ammonia aqueous solution.

A vertical absorber is used so that the absorber can generate concentrated ammonia aqueous solution with a special structure. The path is very short, totally different from the prior art long coiled pipe type. Therefore, the present invention can utilize the most economic pipeline to form the best flow path, thereby greatly shrinking the whole structure, generating better action of heat exchange, reducing the volume and weight of the refrigerating structure, and obtaining better refrigerating effect as compared to the prior art.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. An absorption diffusion type refrigerating structure, comprising:

a concentrated ammonia aqueous solution tank for receiving concentrated ammonia aqueous solution;

a concentrated ammonia aqueous solution pipe for guiding out concentrated ammonia aqueous solution from said concentrated ammonia aqueous solution tank, another end of said concentrated ammonia aqueous solution pips having an opening;

a diluted ammonia aqueous solution pipe sleeved outside said concentrated ammonia aqueous solution pipe and passing across the other end of said concentrated ammonia aqueous solution pipe;

a generator having a heater, said heater abutting on said diluted ammonia aqueous solution pipe so that said diluted ammonia aqueous solution pipe can conduct heat to said concentrated ammonia aqueous solution pipe to let said concentrated ammonia aqueous solution pipe generate vapor;

a separator for separating vapor and liquid, said separator being formed between the open end of said concentrated ammonia aqueous solution pipe and said diluted ammonia aqueous solution pipe;

a rectifier connected with said diluted ammonia aqueous solution pipe to let part of the vapor leaving said separator condense into liquid and then flow back;

a condenser connected with said rectifier to let vapor condense into liquid;

an ammonia liquid pipe, one end thereof being joined at a distal end of said condenser, and the other end thereof being an opening, a liquid-shutting loop forming between the two ends of said ammonia liquid pipe;

a diluted ammonia aqueous solution reflow pipe led out from said diluted ammonia aqueous solution pipe near said concentrated ammonia aqueous solution tank;

an absorber, having a lower end thereof being connected with said concentrated ammonia aqueous solution tank and said diluted ammonia aqueous solution reflow pipe, the joining position of said absorber with said diluted ammonia aqueous solution reflow pipe being lower than said opening of said concentrated ammonia aqueous solution pipe in said separator, said absorber being used to let diluted ammonia aqueous solution react to become into concentrated ammonia aqueous solution, said absorber being connected with an airway, said airway being disposed downwards, ammonia vapor and hydrogen gas passing through said absorber entering said airway to let ammonia vapor condense into ammonia liquid, said airway being connected with an ammonia liquid guide pipe, the other end of said ammonia liquid guide pipe being connected to a region below the liquid face of said concentrated ammonia aqueous solution tank;

a hydrogen pipe, one end thereof being connected to the other end of said airway and disposed upwards, the other end thereof being an opening; and an evaporator having a pipeline, the upper end of said pipeline being closed, the lower end of said pipeline being connected with said concentrated ammonia aqueous solution tank, a rear section of said hydrogen pipe and said ammonia liquid pipe being inserted into said pipeline of said evaporator from near the lower end and extending to the closed end along said pipeline, the open end of said ammonia liquid pipe being lower than the position where said ammonia liquid pipe joins the distal end of said condenser, ammonia liquid and hydrogen gas being simultaneously released out from the closed end of said evaporator to let ammonia liquid absorb heat and perform reaction of heat exchange, the generated ammonia vapor and hydrogen gas then flowing back to be discharged into said concentrated ammonia aqueous solution tank.

2. The absorption diffusion type refrigerating structure as claimed in claim 1, wherein a pipe mouth of said concentrated ammonia aqueous solution pipe is situated in said concentrated ammonia aqueous solution tank, and protrudes out to prevent residue flowing into said concentrated ammonia aqueous solution tank from choking said pipe mouth.

3. The absorption diffusion type refrigerating structure as claimed in claim 1, wherein a pressure equilibrium pipe is further disposed between said condenser pipeline and said airway.

4. The absorption diffusion type refrigerating structure as claimed in claim 3, wherein a capillary device is further disposed in said pressure equilibrium pipe to avoid liquid-shutting phenomenon due to condensation, said capillary device being made of knitted net, fiber bundle, sintered powder, or foaming metal.

5. The absorption diffusion type refrigerating structure as claimed in claim 1, wherein said liquid-shutting loop of said ammonia liquid pipe is U-shaped.

6. The absorption diffusion type refrigerating structure as claimed in claim 1, wherein said absorber is of coiled pipe type.

7. The absorption diffusion type refrigerating structure as claimed in claim 1, wherein said absorber is of vertical pipe type.

8. The absorption diffusion type refrigerating structure as claimed in claim 7, wherein a spiral device of absorber is further disposed in said absorber to guide the flow of diluted ammonia aqueous solution.

9. The absorption diffusion type refrigerating structure as claimed in claim 8, wherein said spiral device of absorber is a spiral groove, concentric grooves, a spiral spring, or a spiral fiber bundle.

10. The absorption diffusion type refrigerating structure as claimed in claim 8, wherein said spiral device of absorber is a capillary device, and said capillary device is made of knitted net, sintered powder, fiber bundle, or foaming metal.

11. The absorption diffusion type refrigerating structure as claimed in claim 1, wherein a capillary device is further disposed between said ammonia liquid guide pipe and said concentrated ammonia aqueous solution tank to prevent condensed ammonia liquid from accumulating in said ammonia liquid guide pipe.

12. The absorption diffusion type refrigerating structure as claimed in claim 1, wherein a capillary device is further disposed in said hydrogen pipe to avoid liquid-shutting phenomenon, and said capillary device is made of knitted net, sintered powder, fiber buddle, or foaming metal.

13. The absorption diffusion type refrigerating structure as claimed in claim 1, wherein a capillary device is further disposed in said evaporator pipeline, said capillary device being situated at the open end of said ammonia liquid pipe to let ammonia liquid steadily flow out and to facilitate the expansion of the liquid face, said capillary device being made of knitted net, sintered powder, fiber bundle, or foaming metal.

14. The absorption diffusion type refrigerating structure as claimed in claim 1, wherein a spiral device of evaporator is further disposed in said evaporator pipeline.

15. The absorption diffusion type refrigerating structure as claimed in claim 14, wherein said spiral device of evaporator is a spiral groove, concentric grooves, a spiral spring, or a spiral fiber bundle.

16. The absorption diffusion type refrigerating structure as claimed in claim 14, wherein said spiral device of evaporator is a capillary device, and said capillary device is made of knitted net, sintered powder, fiber bundle, or foaming metal.

17. The absorption diffusion type refrigerating structure as claimed in claim 1, wherein a capillary device is further disposed in said concentrated ammonia aqueous solution tank, and said capillary device is made of porous knitted net, sintered powder, fiber bundle, or foaming metal.

18. The absorption diffusion type refrigerating structure as claimed in claim 17, wherein part of said capillary device is above the liquid face, while the other part thereof is below the liquid face.

19. The absorption diffusion type refrigerating structure as claimed in claim 1, wherein heat exchangers are further disposed outside said condenser and said absorber, respectively.

20. The absorption diffusion type refrigerating structure as claimed in claim 19, wherein said heat exchanger is a heat radiator, heat-radiating fins, or a cooling water sleeve.

* * * * *